United States Patent
Ganfield et al.

(10) Patent No.: US 10,693,595 B2
(45) Date of Patent: Jun. 23, 2020

(54) ACK CLOCK COMPENSATION FOR HIGH-SPEED SERIAL COMMUNICATION INTERFACES

(71) Applicant: International Business Machines Corporation, Armonk, NY (US)

(72) Inventors: Paul A. Ganfield, Rochester, MN (US); David J. Krolak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/121,542

(22) Filed: Sep. 4, 2018

(65) Prior Publication Data

US 2018/0375618 A1 Dec. 27, 2018

Related U.S. Application Data

(63) Continuation of application No. 15/200,656, filed on Jul. 1, 2016, now Pat. No. 10,128,985.

(51) Int. Cl.
*H04L 1/16* (2006.01)
*H04L 12/861* (2013.01)
*H04L 5/00* (2006.01)
*H04L 1/18* (2006.01)

(52) U.S. Cl.
CPC .......... *H04L 1/1614* (2013.01); *H04L 1/1607* (2013.01); *H04L 1/1887* (2013.01); *H04L 5/0055* (2013.01); *H04L 49/90* (2013.01)

(58) Field of Classification Search
None
See application file for complete search history.

(56) References Cited

U.S. PATENT DOCUMENTS

| | | |
|---|---|---|
| 6,882,624 B1 | 4/2005 | Ma |
| 7,315,515 B2 | 1/2008 | Pazos |
| 8,166,334 B2 | 4/2012 | Lai et al. |

(Continued)

OTHER PUBLICATIONS

Ganfield et al., "ACK Clock Compensation for High-Speed Serial Communication Interfaces", U.S. Appl. No. 15/200,656, filed Jul. 1, 2016.

(Continued)

*Primary Examiner* — Alex Skripnikov
*Assistant Examiner* — Sharmin Chowdhury
(74) *Attorney, Agent, or Firm* — Martin & Associates, LLC; Derek P. Martin

(57) ABSTRACT

In a serial communication interface with transceivers that run on different clocks, an ACK transmit FIFO is used to track packets transmitted, and an ACK receive queue is used to track ACK bits for received packets. The ACK receive queue contains a number of entries, and training for the transceivers begins transmitting ACK bits from the ACK receive queue once the ACK receive queue has multiple valid ACK bits. When the ACK receive queue is less than a lower threshold, an ACK compensation mechanism sends one or more packets that make the ACK receive queue grow. When the ACK receive queue is more than an upper threshold, the ACK compensation mechanism sends one or more packets that make the ACK receive queue shrink. The combination of the ACK receive queue and the ACK compensation mechanism allow dynamically compensating for the different clocks of the two transceivers.

9 Claims, 8 Drawing Sheets

(56) References Cited

U.S. PATENT DOCUMENTS

| | | |
|---|---|---|
| 8,537,853 B2 | 9/2013 | Falahati et al. |
| 8,743,884 B2 | 6/2014 | Moutarlier |
| 8,769,366 B2 | 7/2014 | Axelsson et al. |
| 9,049,017 B2 | 6/2015 | Speight |
| 9,232,493 B2 | 1/2016 | Zhang et al. |
| 2004/0003106 A1 | 1/2004 | Cunningham et al. |
| 2005/0262184 A1 | 11/2005 | Cherukuri et al. |
| 2007/0110055 A1* | 5/2007 | Fischer .................. H04L 47/10 370/389 |
| 2009/0185485 A1 | 7/2009 | Swami |
| 2012/0207087 A1 | 8/2012 | Wentink et al. |
| 2013/0250767 A1 | 9/2013 | Zhong et al. |
| 2014/0047158 A1 | 2/2014 | Frans et al. |
| 2014/0064191 A1 | 3/2014 | Aghili et al. |
| 2015/0334596 A1 | 11/2015 | Szilagyi et al. |

OTHER PUBLICATIONS

IBM, Appendix P—List of IBM Patents or Patent Applications Treated As Related, dated Oct. 1, 2018.

Park et al.; "Preventing Network Performance Interference With ACK-Separartion Queuing Mechanism in a Home Network Gateway using an Asymmetric Link", RTCSA IEEE Inter. Conf. on Aug. 21-24, 2007, pp. 550-555.

Krishnaprasad et al.; "TCP KAY: An End-To-End Improvement to TCP Performance in Lossy Wireless Networks using ACK-DIV Technique & FEC", CONECCT 2015 IEEE Inter, Conf. on Jul. 10-11, 2015, pp. 1-6.

Grazia et al.; "PPINK: Proactive INjection Into acK, a queue manager to impose fair resource allocation Among TCP Flows", WiMob 2015 IEEE 11th Inter. Conf. on Oct. 19-21, 2015, pp. 132-137.

* cited by examiner

Packet Format

| Bits | 0 | 1:11 | 12:203 | 204:239 |
|---|---|---|---|---|
| | ACK | Sequence Number | Data | CRC |

FIG. 2

| Service Packets | |
|---|---|
| Value | Type |
| 0xF0 | TS1 packet |
| 0xF1 | TS2 packet |
| 0xF2 | TS3 packet |
| 0xFA | T-Start packet |
| 0xFF | T-Complete packet |

FIG. 3

ACK CLOCK COMPENSATION FOR HIGH-SPEED SERIAL COMMUNICATION INTERFACES

BACKGROUND

1. Technical Field

This disclosure generally relates to computer systems, and more specifically relates to high-speed serial communication interfaces.

2. Background Art

Some processors use high-speed serial communication interfaces for on-chip communications. In some interfaces, each packet is acknowledged using an ACK (acknowledge) message when the packet is correctly received, and a NACK (negative acknowledge) message when the packet is not received or is incorrectly received. In synchronous interfaces that run off the same clock, it is possible to use a single-bit ACK by training the transceivers on both sides of an interface, during which the transceivers count the cycles from transmitting a packet to getting the ACK bit for the packet. When both transceivers run on the same clock, the number of cycles from transmitting a packet to receiving the ACK bit for the packet is a constant and does not change. The use of single-bit ACKs to acknowledge receipt of a packet is a very efficient way to verify the receipt of packets in a serial communication interface.

When transceivers that communicate with each other run on different clocks, the number of cycles from transmitting a packet to receiving the ACK bit for the packet is no longer constant, but may change due to the mismatch between clocks, even when the clocks are supposedly the same speed. Even a slight difference in clock speed can lead to drift that can cause the number of cycles between transmitting a packet and receiving an ACK bit for the packet to change. Thus, when different clocks are used for two transceivers, the known ways of acknowledging packets using a single-bit ACK will not work.

BRIEF SUMMARY

In a serial communication interface with transceivers that run on different clocks, an ACK transmit FIFO is used to track packets transmitted, and an ACK receive queue is used to track ACK bits for received packets. The ACK receive queue contains a number of entries, and training for the transceivers begins transmitting ACK bits from the ACK receive queue once the ACK receive queue has multiple valid ACK bits. When the ACK receive queue is less than a lower threshold, an ACK compensation mechanism sends one or more packets that make the ACK receive queue grow. When the ACK receive queue is more than an upper threshold, the ACK compensation mechanism sends one or more packets that make the ACK receive queue shrink. The combination of the ACK receive queue and the ACK compensation mechanism allow dynamically compensating for the different clocks of the two transceivers.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a block diagram showing a sample format of a serial data packet that could be used in the serial communication interface in FIG. 1;

FIG. 3 is a table showing examples of different types of service packets that could be used in the serial communication interface in FIG. 1;

DETAILED DESCRIPTION

In a serial communication interface with transceivers that run on different clocks, an ACK transmit FIFO is used to track packets transmitted, and an ACK receive queue is used to track ACK bits for received packets. The ACK receive queue contains a number of entries, and training for the transceivers begins transmitting ACK bits from the ACK receive queue once the ACK receive queue has multiple valid ACK bits. When the ACK receive queue is less than a lower threshold, an ACK compensation mechanism sends one or more packets that make the ACK receive queue grow. When the ACK receive queue is more than an upper threshold, the ACK compensation mechanism sends one or more packets that make the ACK receive queue shrink. The combination of the ACK receive queue and the ACK compensation mechanism allow dynamically compensating for the different clocks of the two transceivers.

Figure 1:
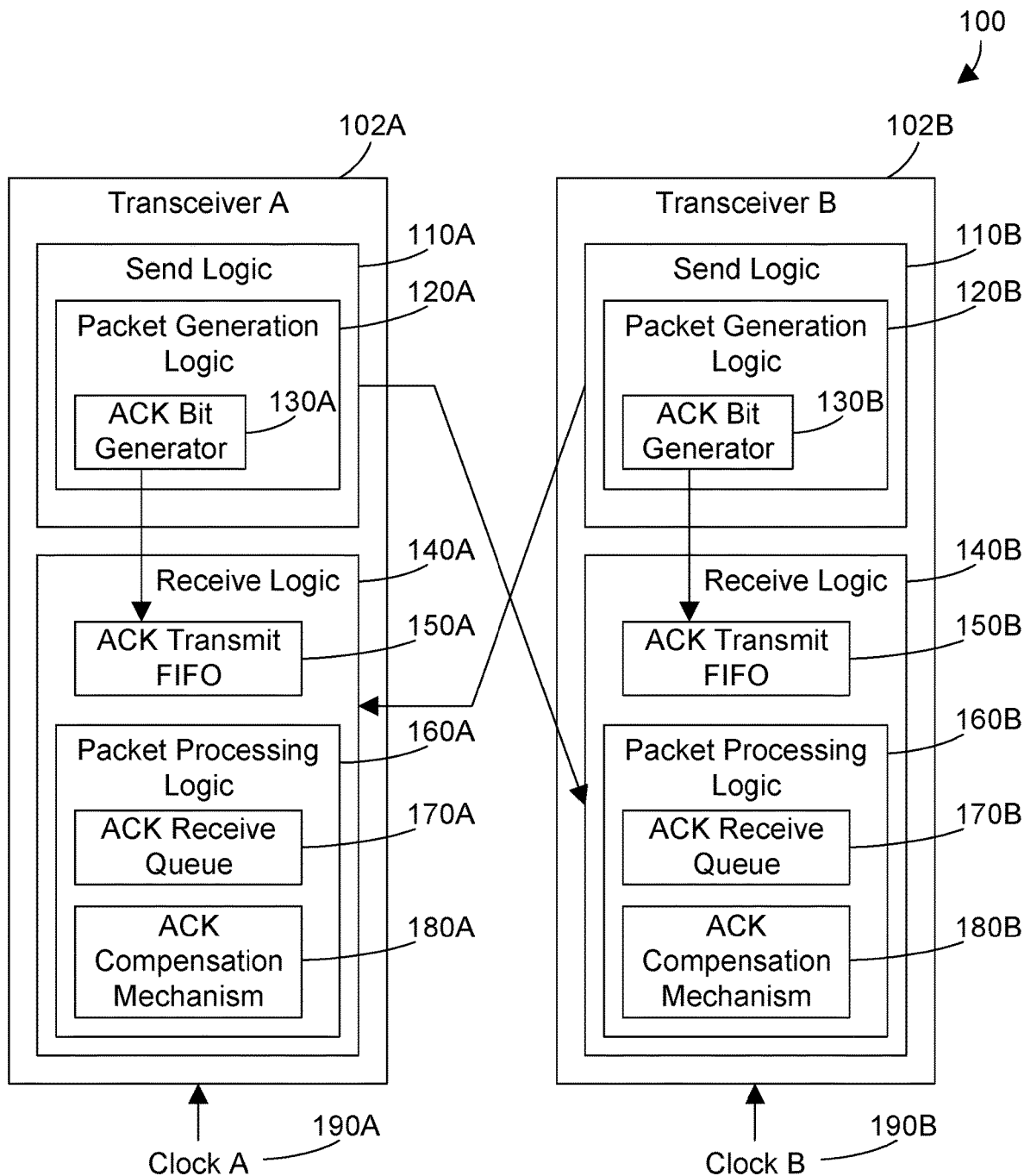
FIG. 1 is a block diagram showing a serial communication interface that uses two serial transceivers running on different clocks to communicate with each other.

Referring to FIG. 1, a serial communication interface 100 includes two transceivers 102A and 102B. In the most preferred implementation, the two transceivers 102A and 102B have identical designs. However, the disclosure and claims herein expressly extend to transceivers that have different designs. Transceiver A 102A runs on Clock A 190A, while transceiver B 102B runs on Clock B 190B. In the most preferred implementation, Clock A 190A and Clock B 190B have the same specified speed, but are not exactly the same because they are derived from different sources. Transceiver A 102A includes send logic 110A and receive logic 140A. Send logic 110A includes packet generation logic 120A that includes an ACK bit generator 130A. Packet generation logic 120A generates packets to be transmitted to Transceiver B 102B. Receive logic 140A includes an ACK transmit first-in-first-out (FIFO) memory 150A and packet processing logic 160A. Packet processing logic 160A includes an ACK receive queue 170A and an ACK compensation mechanism 180A. The functions of the ACK receive queue 170A and ACK compensation mechanism 180A are discussed in more detail below. Transceiver B 102B includes similar components as Transceiver A 102A, with similar components numbered with a "B" suffix instead of the "A" suffix used for Transceiver A.

As discussed in the Background section above, when two transceivers run on the same clock, the number of cycles from transmitting a packet to receiving the ACK bit for the packet is a constant and does not change. In this case, the use of single-bit ACK signals to acknowledge receipt of a packet is a very efficient way to verify the receipt of packets in a serial communication interface. However, when transceivers that communicate with each other run on different clocks, the number of cycles from transmitting a packet to receiving the ACK bit for the packet is no longer constant, but may change due to the mismatch between clocks, even when the clocks are supposedly the same speed. Even a slight difference in clock speed can lead to drift that can cause the number of cycles between transmitting a packet and receiving an ACK bit for the packet to change. Thus, when different clocks are used for two transceivers, as shown in FIG. 1, the known ways of acknowledging packets using a single-bit ACK will not work. The disclosure and claims herein include an ACK receive queue and an ACK compensation mechanism as discussed in more detail below that allow a transceiver to dynamically adjust to drift caused by the transceivers using different clocks.

Referring to FIG. 2, a sample packet format for a serial packet is shown to include an ACK bit at bit 0, followed by an eleven bit Sequence Number, followed by bits for data and bits for a cyclic redundancy check (CRC). Because a single bit is used for the ACK at bit zero of each packet, there must be some mechanism for determining which sent packet corresponds to the received ACK bit, as described in more detail below.

FIG. 3 shows sample service packets that could be used to perform training of a serial communication interface that includes two transceivers, as shown in FIG. 1. There are five types of packets referred to herein as TS1, TS2, TS3, T-Start and T-Complete that are used at various stages of training the two transceivers in a serial communication link, as discussed in more detail below with reference to FIG. 5.

Figure 4:
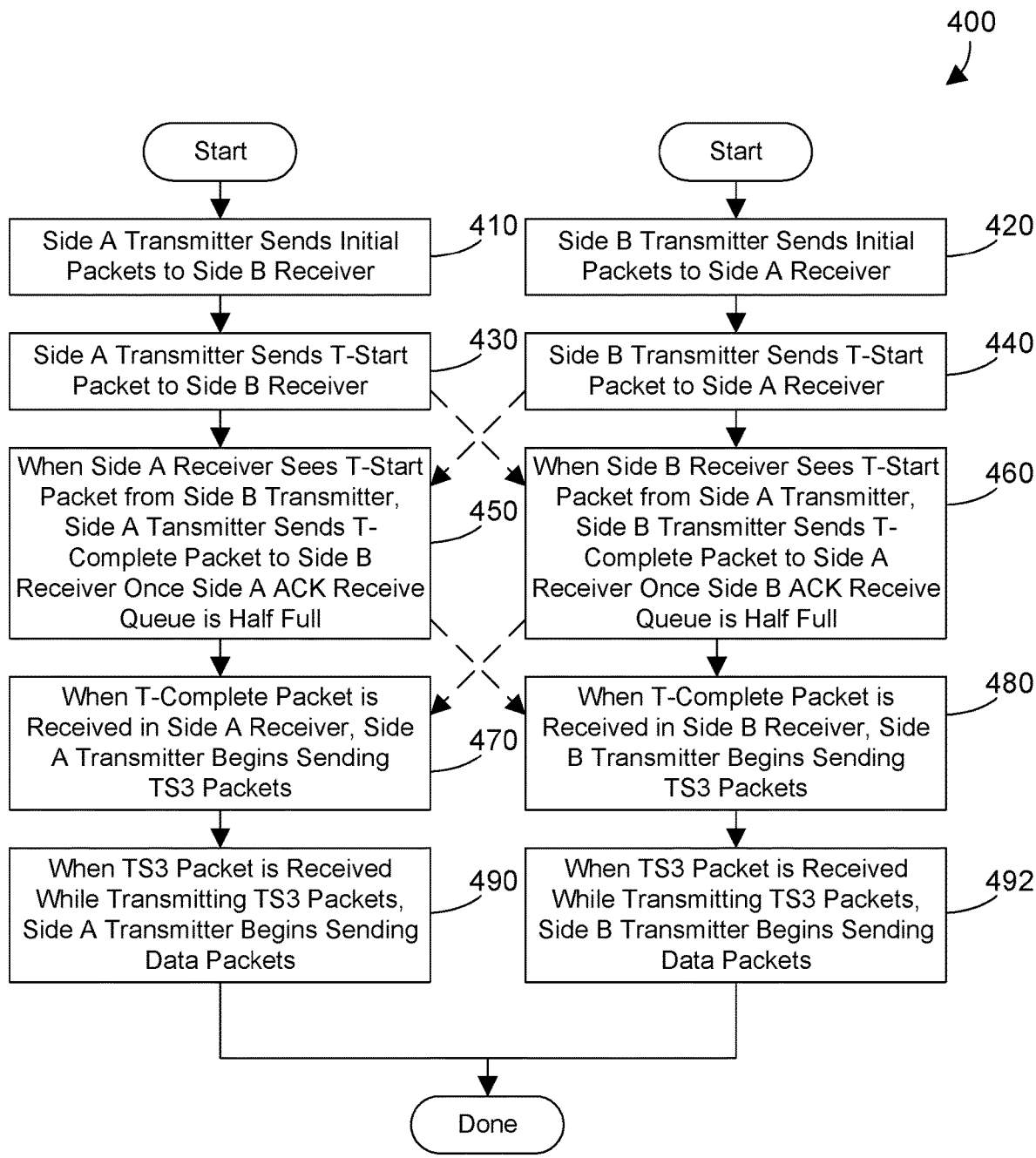
FIG. 4 is a flow diagram of a method for the two transceivers in FIG. 1 to communicate with each other.

FIG. 4 is a flow diagram of a method 400 for two transceivers to send data to each other. The left side of FIG. 4 represents steps performed in Transceiver A 102A in FIG. 1, while the right side of FIG. 4 represents steps performed in Transceiver B 102B in FIG. 1. The Side A transmitter sends initial packets to the Side B receiver (step 410). The Side B transmitter also sends initial packets to the Side A receiver (step 420). Note steps 410 and 420 are not synchronized, and may occur in their respective transceivers at different times. The Side A transmitter sends a T-Start packet to the Side B receiver (step 430), shown by the dotted line from step 430. Similarly, the Side B transmitter sends a T-Start packet to the Side A receiver (step 440), shown by the dotted line from step 440. Once again, steps 430 and 440 are not synchronized with each other. When the Side A receiver sees the T-Start packet from the Side B transmitter, the Side A transmitter sends the T-Complete packet to the Side B receiver once the Side A ACK receive queue is half full (step 450), shown by the dotted line from 450. Similarly, when the Side B receiver sees the T-Start packet from the Side A transmitter, the Side B transmitter sends the T-Complete packet to the Side A receiver once the Side B ACK receive queue is half full (step 460), shown by the dotted line from 460. Note that "half full" is one specific case of when the ACK receive queue has multiple valid ACK bits, and the disclosure and claims herein extend to filling the ACK receive queue with any suitable number of valid ACK bits before transmitting ACK bits from the ACK receive queue. When the T-Complete packet sent by the Side B transmitter is received in the Side A receiver, the Side A transmitter begins sending TS3 packets (step 470). Similarly, when the T-Complete packet sent by the Side A transmitter is received in the Side B receiver, the Side B transmitter begins sending TS3 packets (step 480). When Side A receives one or more TS3 packets while transmitting TS3 packets, the Side A transmitter begins sending data packets (step 490). Similarly, when Side B receives one or more TS3 packets while transmitting TS3 packets, the Side B transmitter begins sending data packets (step 492). Steps 410-492 are thus steps for training the two transceivers A and B to communicate with each other.

Figure 5:
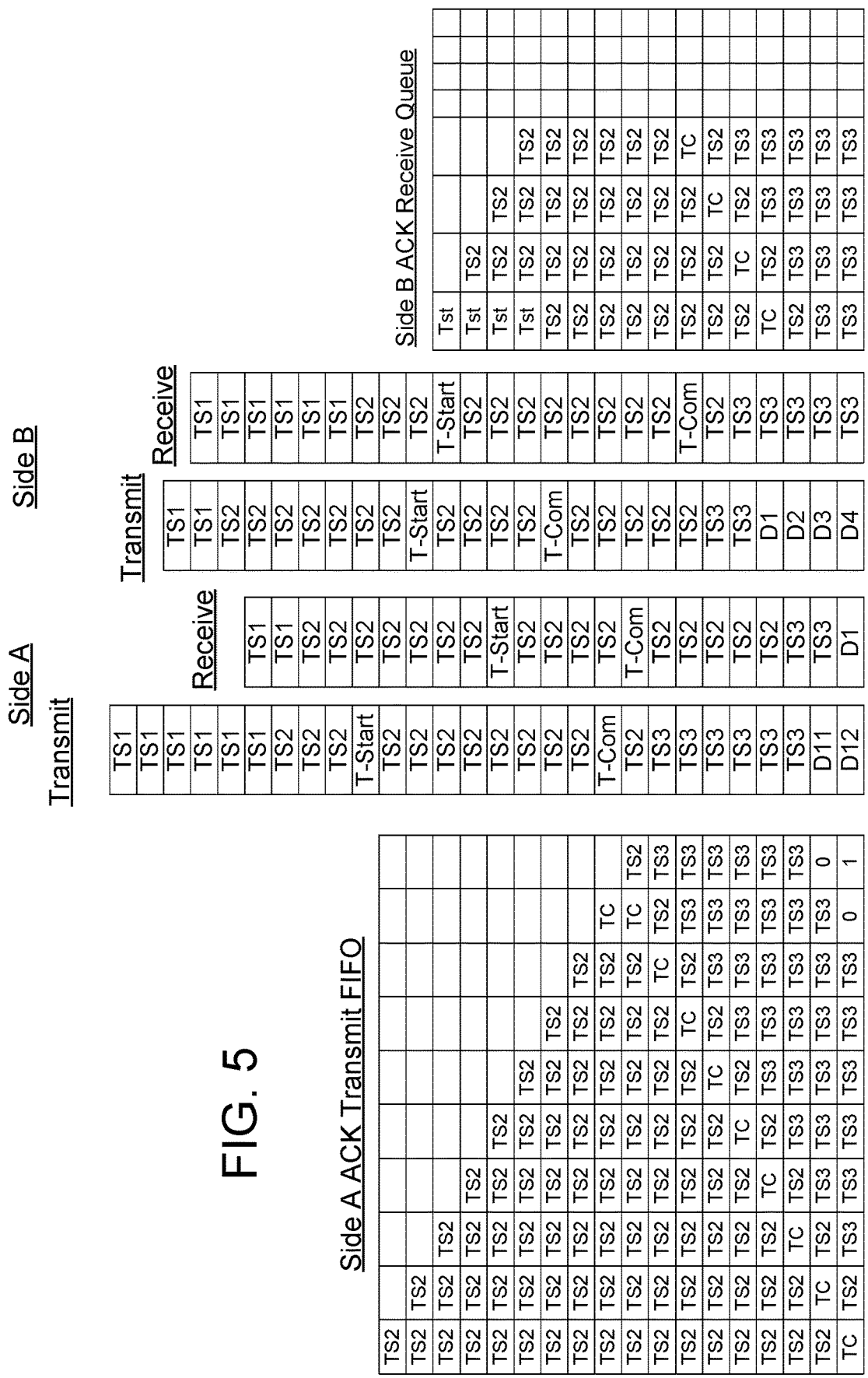
FIG. 5 is a block diagram showing how the transceivers in FIG. 1 communicate with each other using the ACK transmit FIFO and the ACK receive queue.

FIG. 5 shows a diagram that illustrates a specific example that shows the training of the two transceivers and shows the function of the ACK transmit FIFO and the ACK receive queue. FIG. 5 shows packets being transmitted and received by both Side A and Side B. For this specific example, we assume what one side receives is delayed three rows from what the other side transmits. Side A begins by sending TS1 packets, which corresponds to step 410 in FIG. 4. Similarly, Side B begins by sending TS1 packets, which corresponds to step 420 in FIG. 4. Once Side B sees the TS1 packets from Side A, it begins sending TS2 packets. Similarly, once Side A sees the TS1 packets from Side B, it begins sending TS2 packets. When Side A sees one or more TS2 packets from Side B, Side A sends a T-Start packet to Side B, which corresponds to step 430 in FIG. 4. Similarly, when Side B sees one or more TS2 packet from Side A, Side B sends a T-Start packet to Side A, which corresponds to step 440 in FIG. 4.

When Side A receives the T-Start packet from Side B, Side A does not send the T-Complete packet until the Side B ACK Receive Queue is half full. For this specific example in FIG. 5, the Side B ACK Receive Queue is shown to include eight entries of one bit per entry. Thus, four of the eight entries must be filled with valid ACK bits before the first ACK bit is sent to Side A, as discussed in step 450 in FIG. 4. The first entry is the ACK bit for the T-Start packet, shown in the Side B ACK Receive Queue in FIG. 5 as Tst. The second, third and fourth entries are for the next three TS2 packets. Once the fourth entry in the Side B ACK Receive Queue is populated, the T-Complete packet is sent from Side B to Side A, as shown in FIG. 5. Similarly, when Side B receives the T-Start packet from Side A, Side B does not send the T-Complete packet until the Side A ACK Receive Queue is half full, which corresponds to step 460 in FIG. 4. Note, however, the Side A ACK Receive Queue is not shown in FIG. 5. Once the T-Complete packet sent by the Side B transmitter is received in the Side A receiver, Side A begins sending TS3 packets, which corresponds to step 470 in FIG. 4. Similarly, once the T-Complete packet sent by the Side A transmitter is received in the Side B receiver, Side B begins sending TS3 packets, which corresponds to step 480 in FIG. 4. Once Side A receives TS3 packets while sending TS3 packets, the Side A transmitter begins sending data packets, shown in FIG. 5 as D11 and D12, which corresponds to step 490 in FIG. 4. Similarly, once Side B receives TS3 packets while sending TS3 packets, the Side B transmitter begins sending data packets, shown in FIG. 5 as D1, D2, D3 and D4, which corresponds to step 492 in FIG. 4. FIGS. 4 and 5 thus shows the training of the two transceivers to function together to transmit and receive data packets.

Note the labels used in the Side B ACK Receive Queue in FIG. 5 refer to the packet type to which the ACK bit applies. Each entry in each ACK receive queue entry is only one bit, but the bit is correlated to the corresponding packets as shown by the labels in FIG. 5.

FIG. 5 shows the Side A ACK Transmit FIFO to illustrate the function of this FIFO. In this simple example, the Side A ACK Transmit FIFO has ten entries, with each entry containing enough bits for the sequence number for the packet. For the specific packet format shown in FIG. 2, each entry would contain at least 11 bits. The labels used in the Side A ACK Transmit FIFO in FIG. 5 refer to the packet type to which each transmit FIFO entry applies, but it is understood the actual entries in the Side A ACK Transmit FIFO will be packet sequence numbers, which are also known as packet identifiers (IDs). The ACK transmit FIFO is needed because several packets may be transmitted before getting an ACK back, especially in light of the requirement that an ACK receive queue must be half full before any ACK bits are transmitted. The Side A ACK Transmit FIFO preferably has a size that provides an efficient way to handle most communication scenarios. In one specific implementation, the ACK Transmit FIFO has 256 entries and the ACK Receive Queue has sixteen entries. However, the disclosure and claims herein extend to any suitable number of entries in the ACK transmit FIFO and the ACK Receive Queue.

In theory, there is no functional difference between a FIFO and a queue. The primary difference between the ACK transmit FIFO and the ACK receive queue herein are how they are used and the number of bits each entry contains. The ACK transmit FIFO includes multiple entries that each include multiple bits that contain the sequence number (or packet ID) of a sent packet, while the ACK receive queue includes multiple entries that each contain a single bit that indicates an acknowledge (ACK) when the bit is set to one, and a negative acknowledge (NACK) when the bit is set to zero. The difference in labels, calling one a FIFO and the other a queue herein, is to more readily distinguish between these data structures for the sake of clarity.

Figure 6:
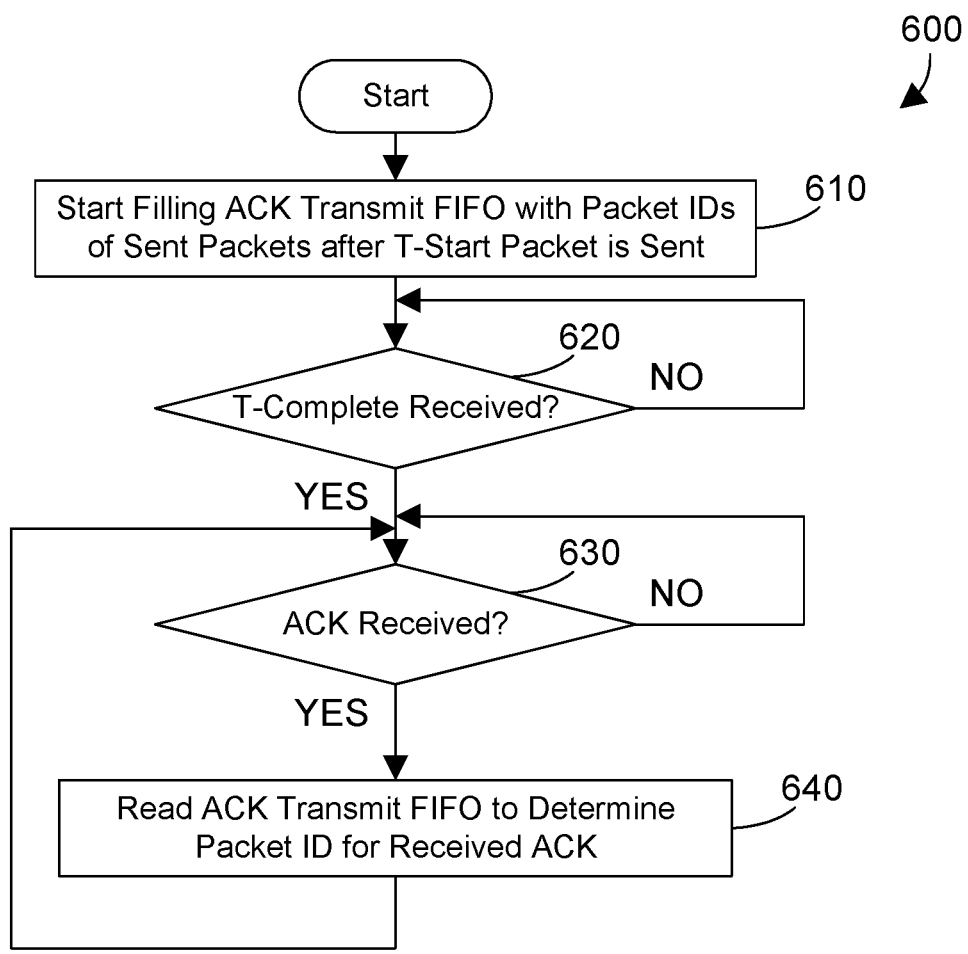
FIG. 6 is a flow diagram of a method for a transceiver to determine from the ACK transmit FIFO to which packet a received ACK applies.

Referring to FIG. 6, a method 600 is preferably performed by a transceiver as disclosed herein. Send logic 110A in FIG. 1 for transceiver A 102A includes packet generation logic 120A, which includes an ACK bit generator 130A that writes the sequence numbers of sent packets to the ACK transmit FIFO 150A. Thus, the packet generation logic 120A starts filling the ACK transmit FIFO with packet identifiers (IDs) of sent packets after the T-Start packet is sent (step 610). Method 600 then waits (step 620=NO) until the T-Complete packet is received (step 620=YES). As long as no ACK is received (step 630=NO), method 600 loops back to step 620 and waits until an ACK is received (step 630=YES). The receive logic 140A then reads the ACK transmit FIFO 150A to determine which packet corresponds to the received ACK (step 640). Step 640 thus correlates a received ACK to the packet ID for the ACK that is stored in the ACK transmit FIFO. Method 600 then loops back to step 630 and continues. Method 600 thus illustrates how the ACK transmit FIFO is used to track the packet IDs for sent packets so when an ACK is received, the packet corresponding to the ACK can be readily determined.

Figure 7:
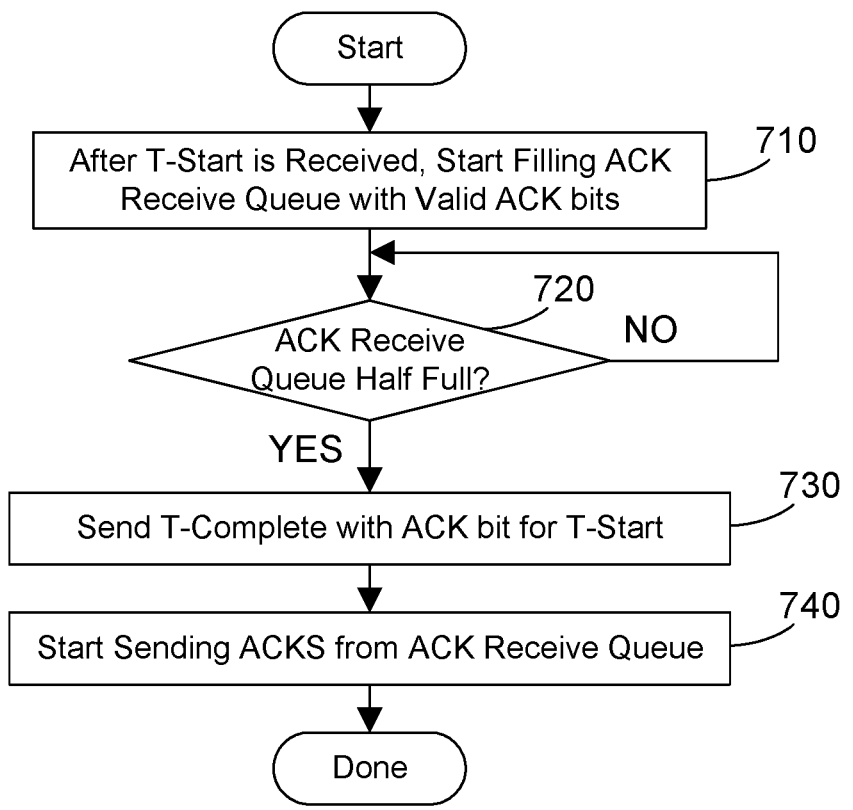
FIG. 7 is a flow diagram of a method for using the ACK receive queue.

Referring to FIG. 7, a method 700 is preferably performed by a transceiver as disclosed herein. Receive logic 140A in FIG. 1 for transceiver A 102A includes packet processing logic 160A, which includes the ACK receive queue 170A and the ACK compensation mechanism 180A. After the T-Start packet is received, the packet processing logic 160A starts filling the ACK receive queue 170A with valid ACK bits (step 710). As long as the ACK receive queue is not half full (step 720=NO), method 700 loops back to step 720 until the ACK receive queue is half full (step 720=YES). At this point the T-Complete packet is sent with the ACK bit for the T-start packet (step 730), and ACKs are then sent from the ACK receive queue (step 740). Method 700 is then done. Note the condition of the ACK receive queue being half full in step 720 is one suitable example of the ACK queue having multiple valid ACK bits, and the disclosure and claims herein extend to any suitable number of valid ACK bits in the ACK receive queue before beginning transmitting ACK bits from the ACK receive queue.

Figure 8:
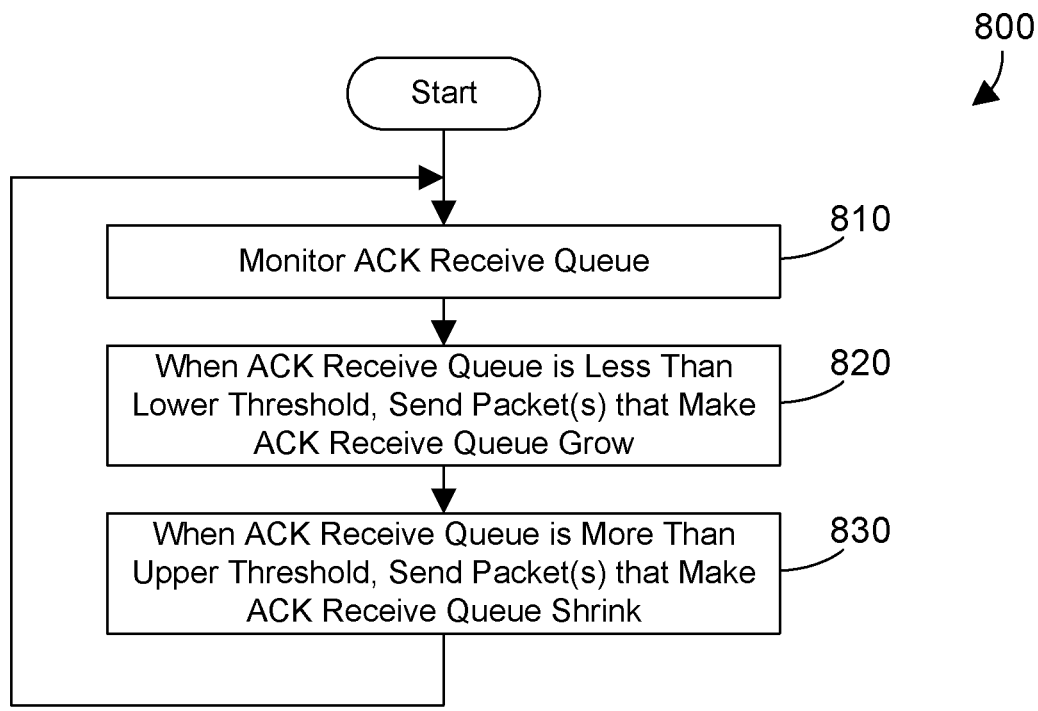
FIG. 8 is a flow diagram of a method for an ACK compensation mechanism in FIG. 1 to monitor its respective ACK receive queue and to compensate by making adjustments that cause the ACK receive queue to grow or shrink, as needed.

Method 800 shown in FIG. 8 is preferably performed by the ACK compensation mechanism, such as 180A and 180B in FIG. 1. The ACK receive queue is monitored (step 810). When the ACK receive queue is less than a predefined lower threshold, one or more packets are sent that make the ACK receive queue grow (step 820). When the ACK receive queue is more than a predefined upper threshold, one or more packets are sent that make the ACK receive queue shrink (step 830). Method 800 thus allows the ACK compensation mechanism to dynamically monitor and adjust for growth or shrinkage of the ACK receive queue that is caused by a mismatch in the clock speeds of the two transceivers.

Note the upper and lower thresholds can be defined in any suitable way. For the simple example given in FIG. 5 with an eight entry ACK receive queue, the lower threshold could be 2 and the upper threshold could be 6. Thus, ACK bits are sent from the ACK receive queue when the ACK receive queue is half full, meaning four entries have valid ACK bits. When the ACK receive queue shrinks to two valid ACK bits, one or more packets are sent to make the ACK receive queue grow. When the ACK receive queue grows to six valid ACK bits, one or more packets are sent to make the ACK receive queue shrink. In this manner the ACK compensation mechanism can dynamically adjust the number of valid ACK bits in the ACK receive queue. Note the growing and shrinking of the ACK receive queue could occur, for example, due to a mismatch between the clocks running the transceivers.

Figure 9:
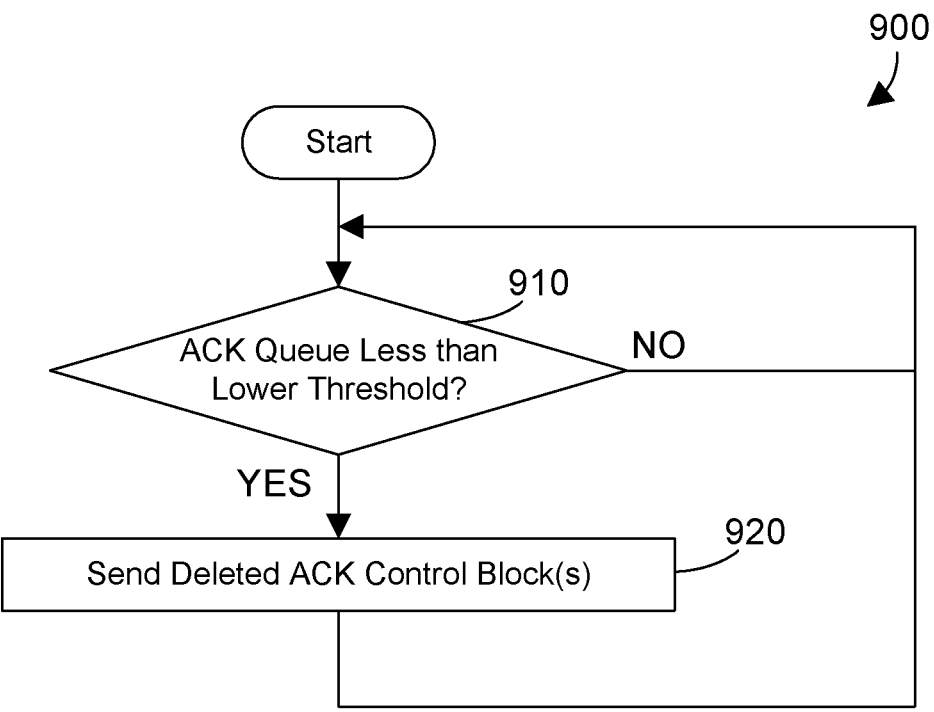
FIG. 9 is a flow diagram of one sample method for performing step 820 in FIG. 8.

Referring to FIG. 9, a method 900 represents one suitable specific implementation for step 820 in FIG. 8. When the ACK queue is not less than the lower threshold (step 910=NO), method 900 loops back to step 910 until the ACK queue is less than the lower threshold (step 910=YES). At this point one or more deleted ACK control blocks are sent (step 920), which causes the number of valid ACK bits in the ACK receive queue to increase, or grow. The deleted ACK control block indicates the next packet doesn't have a valid ACK bit in it, so it doesn't remove a bit from the ACK receive queue, causing it to grow.

Figure 10:
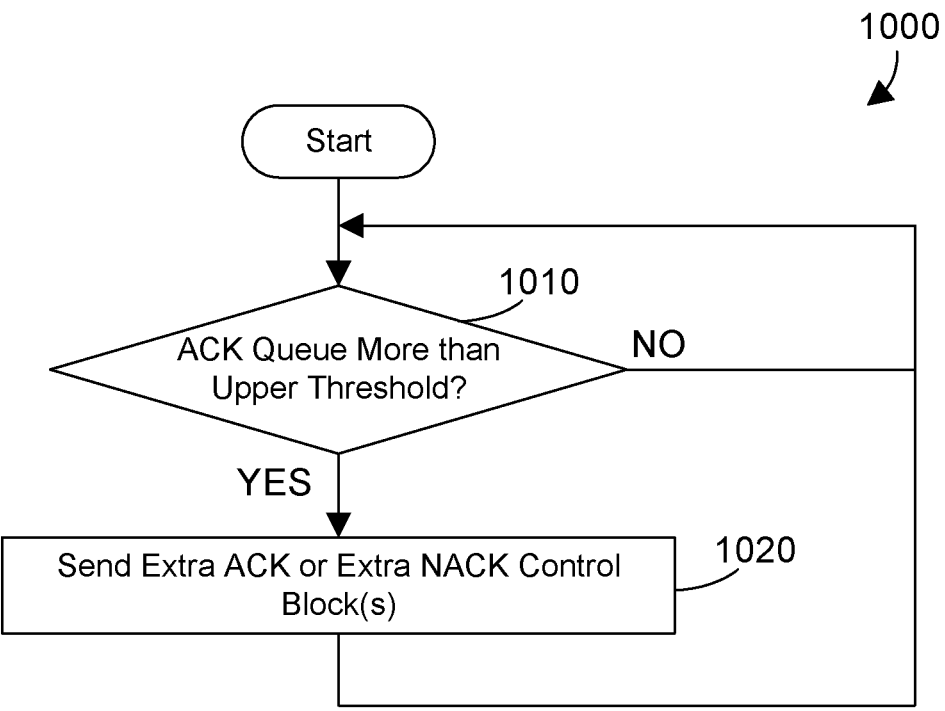
FIG. 10 is a flow diagram of one sample method for performing step 830 in FIG. 8.

Referring to FIG. 10, a method 1000 represents one suitable specific implementation for step 830 in FIG. 8. When the ACK queue is not more than the upper threshold (step 1010=NO), method 1000 loops back to step 1010 until the ACK queue is more than the upper threshold (step 1010=YES). At this point one or more extra ACK or extra NACK control blocks are sent (step 1020), which causes the number of valid ACK bits in the ACK receive queue to decrease, or shrink. The extra ACK/NACK control block reads a bit from the queue to send an ACK in between packets, removing an extra ACK bit from the ACK receive queue, causing it to shrink.

Note the decision blocks in the drawings show specific conditions, such as "less than the lower threshold" in step 910 in FIG. 9. These are shown by way of example. One skilled in the art will recognize that any suitable thresholds could be selected, and any suitable conditions, such as "less than or equal to the lower threshold" could be used. The specific examples herein are shown to illustrate basic concepts, and are not intended to be limiting.

Figure 11:
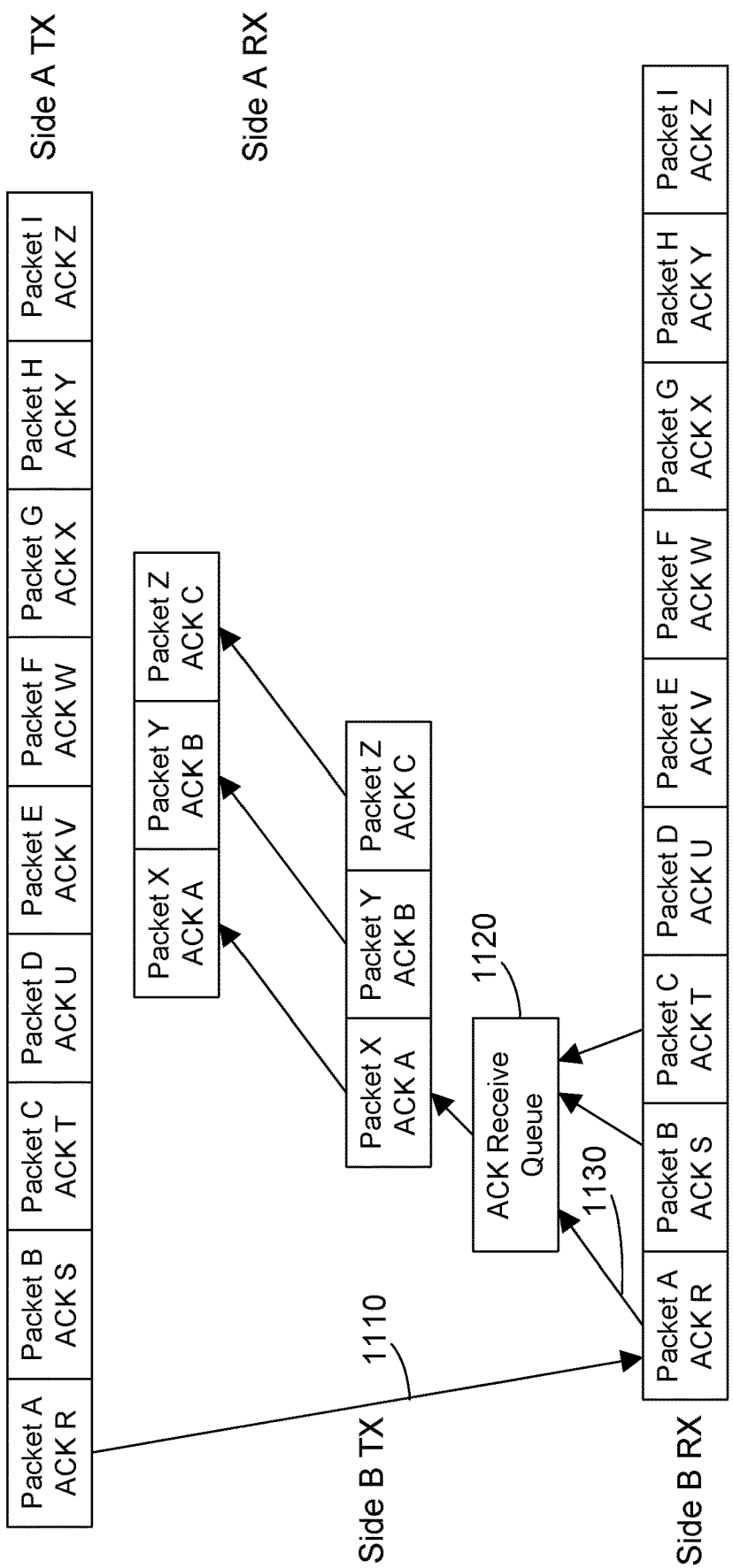
FIG. 11 is a diagram showing a specific example that illustrates using the ACK receive queue.

FIG. 11 shows an example for Transceiver A 102A communicating with Transceiver B 102B in FIG. 1. We assume for this example the training of the two transceivers as illustrated in FIG. 5 has been completed, and the two transceivers are now exchanging valid data packets. This means the ACK receive queue 1120 includes multiple valid ACK bits, such as four valid ACK bits for the example of an eight bit ACK receive queue, as shown in FIG. 5. We assume Packet A with an ACK bit for packet R is sent from the transmit side of Transceiver A (Side A TX) to the receive side of Transceiver B (Side B RX), as shown at 1110 in FIG. 11, followed by Packet B and Packet C. An ACK bit for Packet A, shown in FIG. 11 as ACK A, is generated when Packet A is received, and is added to the ACK receive queue 1120, as shown at 1130 in FIG. 11. In similar fashion, the ACK bits for Packet B (ACK B) and Packet C (ACK C) are also generated and written to the ACK receive queue 1120. These ACK bits can then be sent with the next data packets transmitted from the transmitter of Transceiver B (Side B TX) to the receiver of Transceiver A (Side A RX). FIG. 11 shows Packet X is transmitted with ACK A, Packet Y is transmitted with ACK B, and Packet Z is transmitted with ACK C. When these packets are received in the receive logic of Transceiver A (Side A RX), each received ACK causes the next entry on the ACK transmit FIFO to be read, which allows the receive logic to correlate each received ACK to the sent packet being acknowledged by the ACK.

The combination of the ACK transmit FIFO, ACK receive queue, and ACK compensation mechanism allows two transceivers that are run by different clocks to communicate with each other in a reliable fashion.

In the most preferred implementation, the ACK transmit FIFO, ACK receive queue, and ACK compensation mechanism are implemented in hardware. Note, however, the ACK compensation mechanism could be implemented using any suitable combination of hardware and software.

In a serial communication interface with transceivers that run on different clocks, an ACK transmit FIFO is used to track packets transmitted, and an ACK receive queue is used to track ACK bits for received packets. The ACK receive queue contains a number of entries, and training for the transceivers begins transmitting ACK bits from the ACK receive queue once the ACK receive queue has multiple valid ACK bits. When the ACK receive queue is less than a lower threshold, an ACK compensation mechanism sends one or more packets that make the ACK receive queue grow. When the ACK receive queue is more than an upper threshold, the ACK compensation mechanism sends one or more packets that make the ACK receive queue shrink. The combination of the ACK receive queue and the ACK compensation mechanism allow dynamically compensating for the different clocks of the two transceivers.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A transceiver for sending and receiving network packets, the transceiver comprising:
   packet processing logic that receives the network packets, the packet processing logic comprising an acknowledge (ACK) receive queue that includes a plurality of single-bit entries, wherein the packet processing logic generates an ACK bit for each received network packet, stores each ACK bit in the ACK receive queue, and waits until multiple of the plurality of entries in the ACK receive queue contain valid ACK bits before transmitting one of the valid ACK bits from the ACK receive queue; and
   an ACK compensation mechanism that monitors the ACK receive queue, and when a number of valid ACK bits in the ACK receive queue is less than a predetermined lower threshold, the ACK compensation mechanism sends at least one network packet that increases the number of valid ACK bits in the ACK receive queue, wherein the at least one network packet that increases the number of valid ACK bits in the ACK queue comprises a deleted ACK control block that indicates the next transmitted packet does not have a valid ACK bit, and when the number of valid ACK bits in the ACK receive queue is greater than a predetermined upper threshold, the ACK compensation mechanism sends at least one network packet that decreases the number of valid ACK bits in the ACK receive queue, wherein the at least one network packet that decreases the number of valid ACK bits in the ACK queue comprises an extra ACK control block.

2. The transceiver of claim 1 further comprising:
   an ACK transmit first-in-first-out (FIFO); and
   send logic that writes a packet identifier to the ACK transmit FIFO to identify a packet that was sent by the send logic.

3. The transceiver of claim 2 further comprising receive logic that reads the ACK transmit FIFO to determine a packet identifier corresponding to a received ACK bit.

4. The transceiver of claim 1 wherein the at least one network packet that decreases the number of valid ACK bits in the ACK queue comprises an extra negative acknowledge (NACK) control block.

5. A method for transmitting and receiving data between first and second transceivers, the method comprising:
   providing an acknowledge (ACK) receive queue that includes a plurality of single-bit entries;
   generating an ACK bit for each received network packet;
   storing each ACK bit in the ACK receive queue;
   when multiple of the plurality of entries in the ACK receive queue contain valid ACK bits, transmitting one of the valid ACK bits from the ACK receive queue;
   monitoring the ACK receive queue;
   when a number of valid ACK bits in the ACK receive queue is less than a predetermined lower threshold, sending at least one network packet that increases the number of valid ACK bits in the ACK receive queue, wherein the at least one network packet that increases the number of valid ACK bits in the ACK queue comprises a deleted ACK control block that indicates the next transmitted packet does not have a valid ACK bit; and
   when the number of valid ACK bits in the ACK receive queue is greater than a predetermined upper threshold, sending at least one network packet that decreases the number of valid ACK bits in the ACK receive queue, wherein the at least one network packet that decreases the number of valid ACK bits in the ACK queue comprises an extra ACK control block.

6. The method of claim 5 wherein the first and second transceivers run on different clocks.

7. The method of claim 5 further comprising:
writing a packet identifier to an ACK transmit first-in-first-out (FIFO) to identify a packet that was sent.

8. The method of claim 7 further comprising receive logic that reads the ACK transmit FIFO to determine a packet identifier corresponding to a received ACK bit.

9. The method of claim 5 wherein the at least one network packet that decreases the number of valid ACK bits in the ACK queue comprises an extra negative acknowledge (NACK) control block.

* * * * *